W. S. HUNT.
Fabric for Carpet Linings, &c.
No. 227,109. Patented May 4, 1880.
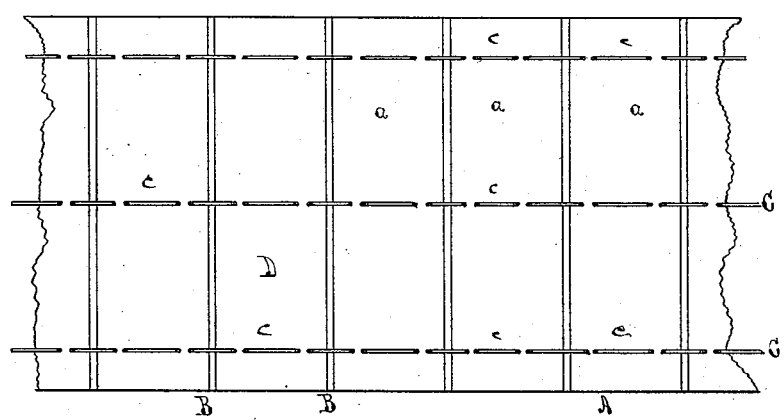
Witnesses
Wm. S. Brown
W. C. Wardwell
Inventor
Walter S. Hunt
By Charles E. Pratt,
Atty

UNITED STATES PATENT OFFICE.

WALTER S. HUNT, OF PROVIDENCE, RHODE ISLAND, ASSIGNOR OF ONE-FOURTH OF HIS RIGHT TO DAVID HUNT, JR., OF BOSTON, MASS.

FABRIC FOR CARPET-LININGS, &c.

SPECIFICATION forming part of Letters Patent No. 227,109, dated May 4, 1880.

Application filed January 26, 1880.

*To all whom it may concern:*

Be it known that I, WALTER S. HUNT, of the city of Providence, in the State of Rhode Island, have invented certain new and useful Improvements in Fabrics for Carpet-Linings and other purposes, of which the following is a specification.

In the articles of manufacture known as "carpet-linings," or "padding for upholstery," or "fabrics for matting," &c., among the principal objects to be sought are cheapness of material and construction, sufficient openness of texture to admit of dust passing freely through instead of remaining on the surface, durability, and strength to withstand both constant wear and frequent removal and relaying for cleaning purposes, elasticity or softness and springiness in use, and freedom from litter and breakage in handling and destruction by use.

In the effort to obtain these objects cotton, straw, and other materials have been inclosed between two layers of paper. Corrugated or ribbed paper has been used, which, however, soon loses its corrugations by wear, and becomes hard and flat, and neither of these allows ventilation or the passage of dust through to the floor or under supporting-surface.

I have also invented and used heretofore fabrics composed of two or more layers of straw, rushes, flags, &c., held together by threads, as shown in Letters Patent numbered 223,047, and dated December 13, 1879.

My present invention is in the nature of an improvement on all these; and it consists in a new article of manufacture and a method of making it, which I will now describe.

The chief material which I use is paper of the coarser and cheaper kinds, for economy. In one way of making this is slashed or cut into strips, and then two or more layers of this slashed paper are laid together and secured by stitching through and through.

The preferable method of making this fabric is as follows: I take the paper in long sheets, one or more thicknesses together, as desired, and then slash or cut it transversely into very narrow strips, using for this purpose, preferably, a large knife with an edge having a large angle, so as to bend and compress the cut edges, and thus give the paper the effect of corrugation with the added advantage of interstices quite through it. For this purpose a yielding block or soft cutting-bed is preferred. Several knives may be used together and arranged on a cylindrical cutter for rapidity of work. Sometimes I give the knives an oblique action to the surface of the paper, especially where two or more thicknesses are cut together. I make the slashes thus made extend nearly, but not quite, across the sheet, leaving about an inch of continuous selvage on either side, to hold the narrow strips in place, and so that the slashed sheet may still be handled. I then take two or more of these slashed sheets placed together, and stitch or quilt them longitudinally through and through by means of a gang sewing-machine, or otherwise, in lines of, say, one or two inches apart, and then, if desired, the selvage or unslashed edges may be cut off, and a strong, open, durable, and cheap fabric is obtained for any of the purposes above referred to.

In the drawings, Figure 1 represents a piece of this fabric in section, much enlarged, showing three layers of slashed paper and the stitches; and Fig. 2 shows a top or plan view of the same, enlarged as before.

A A A are sheets of paper divided by slashes B B into narrow strips *a a a*, and held by threads C C C in transverse stitches *c c c* together in one fabric, D, as above described.

It is evident that any desired thickness may be obtained by increasing the number of layers.

I claim as new and of my invention—

1. The method of making a fabric by slashing two or more layers of paper and arranging and quilting them together, substantially as above described.

2. As a new article of manufacture, a fabric constructed of two or more layers of slashed paper arranged and quilted or stitched together, substantially as herein set forth.

WALTER S. HUNT.

Witnesses:
 STEPHEN ESSEX,
 H. C. PIERCE.